No. 772,326. PATENTED OCT. 11, 1904.
A. L. ALLIN.
INDEXING DEVICE OR CARD RECORD SYSTEM.
APPLICATION FILED JAN. 12, 1904.
NO MODEL. 3 SHEETS—SHEET 1.
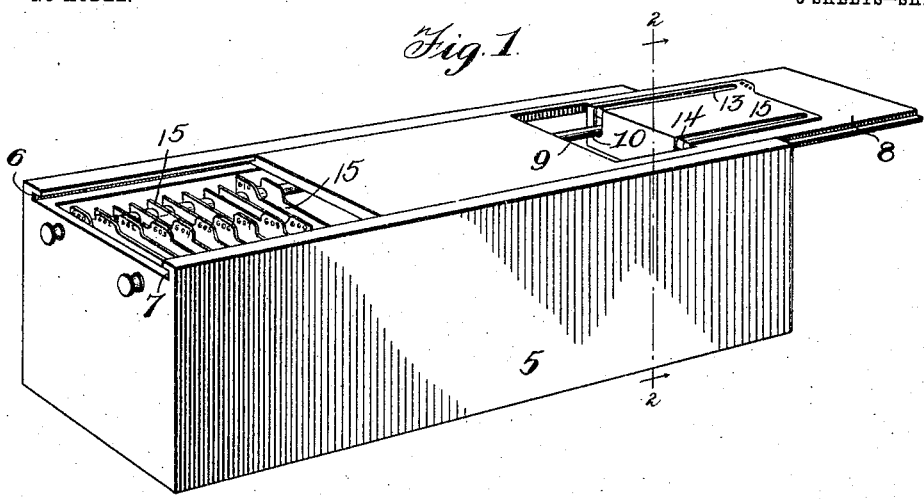
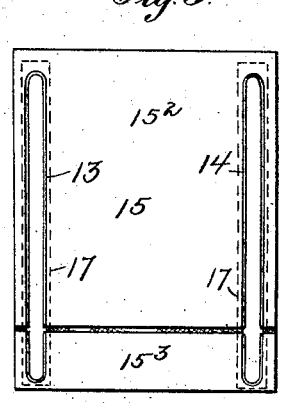
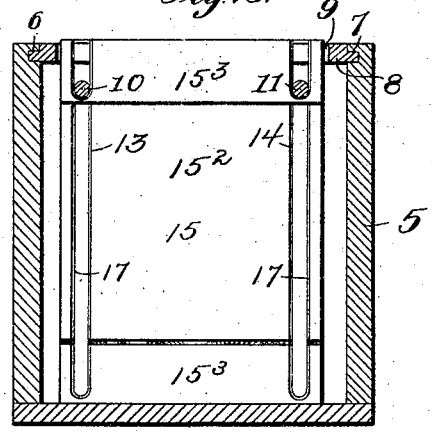
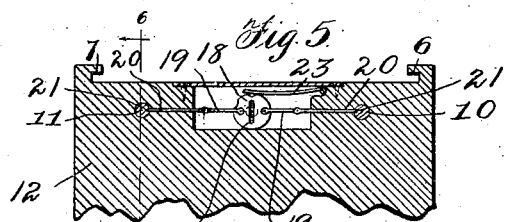
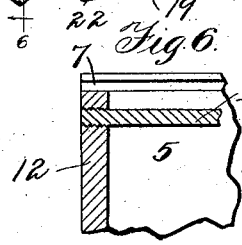
Witnesses:
Clifford Allin
Edgar A. Banghey
Inventor:
Arthur L. Allin
By his Attorney
Frank G. Campbell No. 772,326. PATENTED OCT. 11, 1904.
A. L. ALLIN.
INDEXING DEVICE OR CARD RECORD SYSTEM.
APPLICATION FILED JAN. 12, 1904.
NO MODEL. 3 SHEETS—SHEET 2.
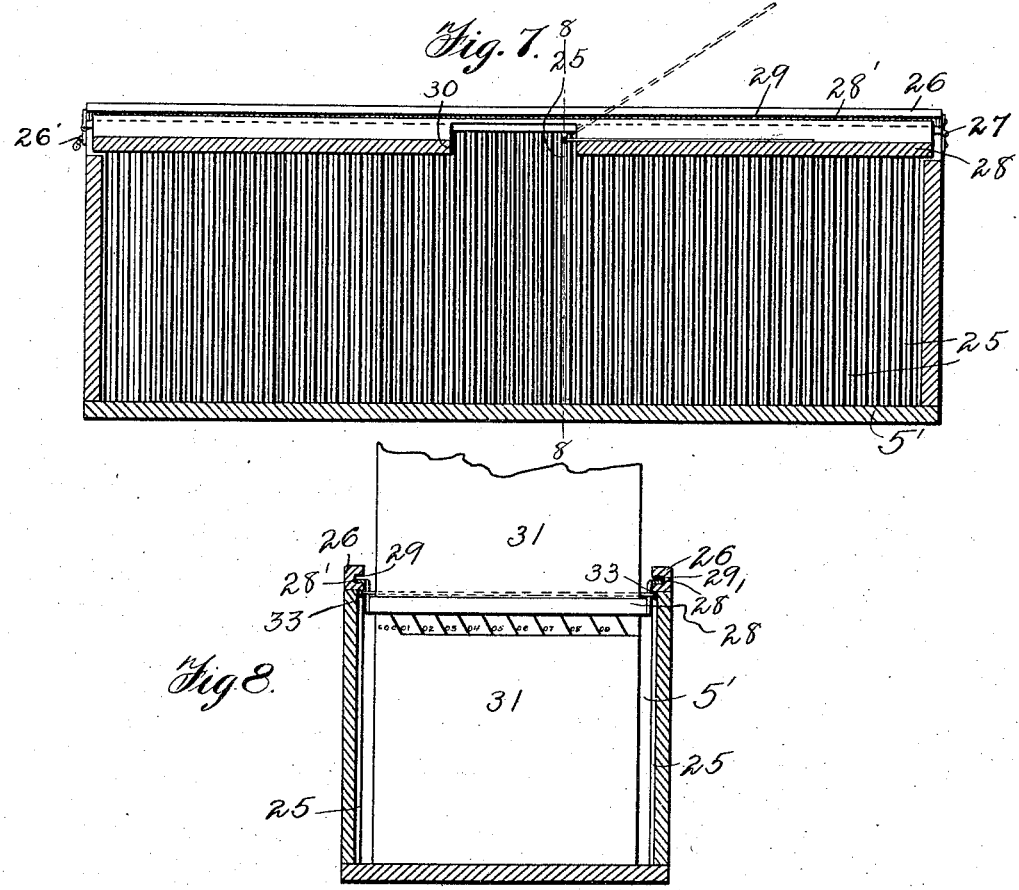
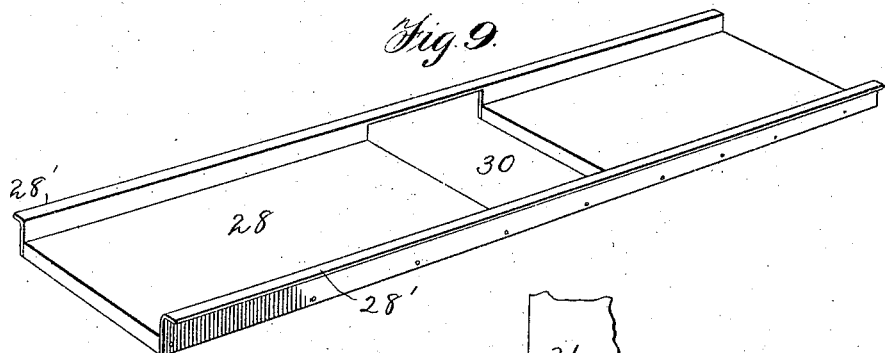
Witnesses:
Inventor:
Arthur L. Allin
By his Attorney
Frank J. Campbell.

No. 772,326. PATENTED OCT. 11, 1904.
A. L. ALLIN.
INDEXING DEVICE OR CARD RECORD SYSTEM.
APPLICATION FILED JAN. 12, 1904.
NO MODEL. 3 SHEETS—SHEET 3.
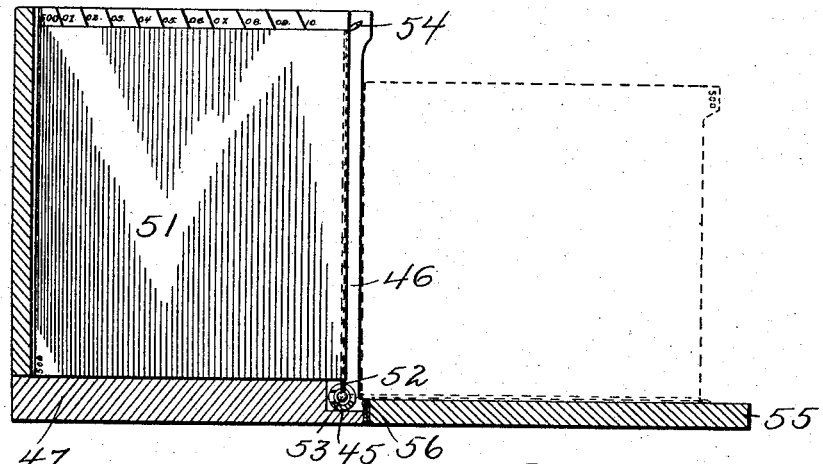
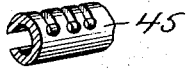
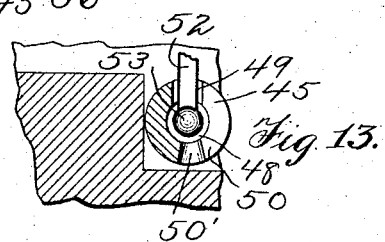
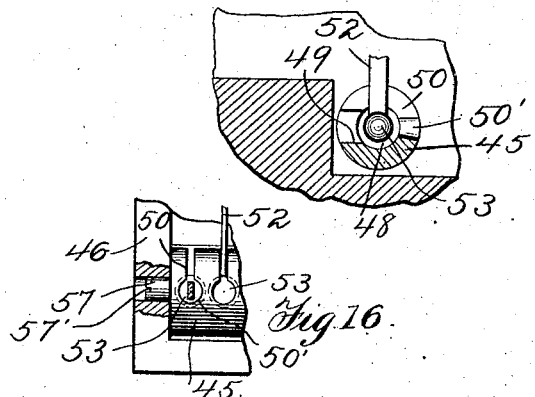
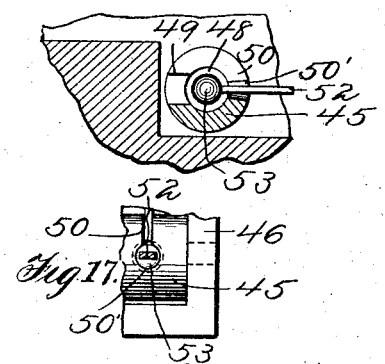
Witnesses:
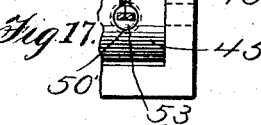
Inventor:
Arthur L. Allin
By his Attorney
Frank G. Campbell No. 772,326. Patented October 11, 1904.

UNITED STATES PATENT OFFICE.

ARTHUR L. ALLIN, OF MIDDLETOWN, CONNECTICUT.

INDEXING DEVICE OR CARD-RECORD SYSTEM.

SPECIFICATION forming part of Letters Patent No. 772,326, dated October 11, 1904.

Application filed January 12, 1904. Serial No. 138,765. (No model.)

*To all whom it may concern:*

Be it known that I, ARTHUR L. ALLIN, a citizen of the United States of America, residing at Middletown, in the county of Middlesex and State of Connecticut, have invented certain new and useful Improvements in Indexing Devices or Card-Record Systems, of which the following is a specification.

My invention relates to a card record or index and has for its object the provision, in such a device, of a receptacle in which the cards are movably mounted in such manner that while said cards may be partially withdrawn when it is desired to refer to them or to enter new matter thereon they will be locked against complete removal by unauthorized persons.

A further object of the invention is the provision of a receptacle carrying a movable posting-board, thereby providing a rest for the cards when they are withdrawn for the purpose of entering new matter upon them.

Further objects and advantages of the invention will be set forth in the detailed description which now follows.

In the accompanying drawings, Figure 1 is a perspective view of a card-index device constructed in accordance with the invention. Fig. 2 is a transverse vertical section of the same, taken upon line 2 2 of Fig. 1. Fig. 3 is an elevation of a card employed therein. Fig. 4 is a sectional view of such card. Fig. 5 is a transverse vertical section taken through the rear end board of the receptacle, showing a locking device hereinafter described. Fig. 6 is a section upon line 6 6 of Fig. 5. Fig. 7 is a longitudinal section of a modified form of the device. Fig. 8 is a transverse vertical section upon line 8 8 of Fig. 7. Fig. 9 is a detail perspective view of a posting-board hereinafter described. Fig. 10 is a horizontal sectional view of one of the side walls of the receptacle, showing the grooves or ways in which the cards are mounted. Fig. 11 is a transverse section of a further modification of the device. Fig. 12 is a detail perspective view of a portion of a slotted locking-cylinder employed in conjunction therewith. Figs. 13, 14, and 15 are detail transverse sections, upon a larger scale, of said cylinder, showing the various positions it assumes, as will be hereinafter described; and Figs 16 and 17 are front elevations of said cylinder, showing the manner of mounting it between the end walls of the receptacle and also showing the positions assumed by the shanks of the cards, as will be hereinafter described.

Like numerals designate similar parts in all of the figures of the drawings.

Referring to Figs. 1, 2, 5, and 6 of the drawings, the numeral 5 designates a receptacle which may be of any convenient form, said receptacle being provided with ways 6 and 7, in which is movably mounted a posting-board 8, having an opening 9 therethrough for a purpose which will be hereinafter set forth. Locking-rods 10 and 11 pass through said receptacle longitudinally thereof and are threaded into the rear wall 12, as best illustrated in Fig. 6. These rods pass through vertical slots 13 and 14, formed in cards 15, the detail construction of said cards being clearly illustrated in Figs. 3 and 4, from which it will be seen that these cards are formed of a double thickness of material and that between these thicknesses a piece of linen or other fabric is inserted in such manner that the upper portions $15^2$ of said cards are hinged with relation to the lower portions $15^3$ thereof and may be readily bent into a horizontal plane, as illustrated in Fig. 1. If desired, a metal strip 17 may be inserted between the two thicknesses of material forming the card proper, said metal strip having a slot for the reception of the rods 10 and 11, said strip serving when this is done to protect the walls of the slots 13 and 14 from wear. If desired, this strip may be dispensed with and a gromet substituted therefor. To lock the rods 10 and 11, and consequently the cards 15, against removal by unauthorized persons, the mechanism shown in Fig. 5 is provided, said mechanism comprising the rotatable disk 18, to which are pivoted the links 19, which actuate the bolts 20, said bolts being adapted to engage recesses 21 in the ends of rods 10 and 11 and lock them against rotation, as will be readily understood. When it is desired to remove said rods, the disk is rotated by inserting a key in slot 22 thereof until the bolts 20 are withdrawn from recesses 21, after which the rods may be rotated to unscrew them from engagement with the wall 12. A spring 23 snaps into recesses of the disk 18 at the limit of movement of said disk to lock the mechanism in either of its extreme positions. It is not essential that the rods 10 and 11 be threaded into wall 12, for an angular rod may be substituted for the round one shown. The operation of this form of the device is as follows: When it is desired to withdraw a card for reference, the posting-board 8 is moved into such a position that the card may be drawn through the opening 9 thereof, after which said card is bent over and rests upon the posting-board, as illustrated in Fig. 1. By virtue of this construction a solid support for said card is provided, which is found to be a great convenience when additional matter is to be entered thereon, the posting-board not only forming said support for the card, but also a rest for the hand of the writer.

In Figs. 7, 8, 9, and 10 means are shown for accomplishing the objects of the invention without bending the card. To accomplish that end, the receptacle 5' is provided, having a series of dovetailed grooves 25 formed in the sides thereof, in which the cards are slidably mounted. Rails 26 are hinged at 27 to the receptacle proper and are locked in position at 26' to close the tops of the grooves 25. Flanges 28', carried by a posting-board 28, engage ways 29 of rails 26. An opening 30, formed in said posting-board, permits the cards 31 to be drawn therethrough, when they may be turned down until they rest upon said posting-board, as shown in Fig. 7. It will be seen that by providing the flanges 28' the posting-board is made to lie in a plane lower than the tops of the grooves 25, and by virtue of such construction the card when drawn to the upper ends of said grooves may be turned down bodily and without bending it. As shown in Fig. 10, the method of slidably securing the cards in grooves 25 consists in passing a rod or wire 32 through the lower end of said card and in providing washers 33 upon the ends of said rods to prevent their removal from the slots except through the open tops of the same.

Figs. 11, 12, 13, 14, 15, 16, and 17 illustrate a form of the invention in which a slotted cylinder 45, rotatably mounted between the end walls 46 of a receptacle 47, provides the means for locking the cards in position. Cylinder 45 has a central bore 48, a longitudinal slot 49, and a series of partly-circumferential slots 50, enlarged at 50' for a purpose hereinafter described. The cards 51 are attached to flat metal strips 52, which pass through the slots 50 and carry at their inner ends balls 53. Finger-grasps 54 provide means for withdrawing the cards and for tilting them to the position shown in dotted lines in Fig. 16. In Fig. 13 the cylinder 45 has been moved to a position in which the cards may be removed from engagement therewith or new cards may be inserted, for it will be seen that the longitudinal slot 49 is of sufficient amplitude to permit the balls 53 to pass therethrough. In Fig. 14 the parts are shown in the position they assume when the cylinder has been partly rotated to lock the cards against complete removal and when the cards are in the position shown in full lines in Fig. 11. In Figs. 15 and 17 the parts are in the position they assume when the card has been withdrawn and turned down upon a posting-board 55, which is hinged at 56 to the receptacle 47, thereby providing means for closing the open side of said receptacle, if desired. By enlarging the slots 50 at 50' locking-recesses are provided in which the shanks of the cards may turn, while the ball ends are prevented from passing through. It will be seen by referring to Figs. 16 and 17 that the cards cannot be swung inwardly until they are turned into the position indicated in dotted lines in Fig. 11. The bearing end 57 of cylinder 45 is slotted at 57' for the reception of a key when it is desired to turn said cylinder.

From the foregoing description it will be seen that simple and efficient means have been provided for accomplishing the objects set forth, and while the elements herein shown and described are well adapted to serve the purposes for which they are intended it is to be understood that my invention is not limited thereto, for changes may be made in the details of the device without departure therefrom.

Having described my invention, what I claim is—

1. In a card-index, the combination, with a receptacle for cards, of a posting-board slidable longitudinally thereof.

2. In a card-index, the combination, with a receptacle for cards, of a posting-board slidably mounted thereon.

3. In a card-index, the combination, with a receptacle for cards, of a movable posting-board having an opening to permit the passage of said cards therethrough.

4. In a card-index, the combination, with a receptacle for cards, of a posting-board having an opening to permit the passage of said cards therethrough and a sliding connection between said cards and said receptacle, whereby said cards may be withdrawn from the receptacle until they rest upon the posting-board.

5. In a card-index, the combination, with a receptacle for cards, of a posting-board, a sliding connection between said cards and said receptacle, whereby said cards may be withdrawn from the receptacle until they rest upon the posting-board, and key-controlled means for locking said cards against removal from said receptacle.

6. In a card-index, the combination, with a receptacle, of cards mounted for swinging and vertical sliding movements in said receptacle, means for limiting the vertical movement of said cards, and a posting-board the upper face of which lies in a plane lower than the upper limit of movement of said cards.

7. In a card-index, the combination, with a receptacle, of cards mounted for swinging and vertical sliding movements in said receptacle and a posting-board having an opening therethrough, the upper face of said posting-board lying in a plane lower than the upper limit of movement of the cards.

8. The combination, with a receptacle, of cards slidably mounted for vertical movement in said receptacle, ways formed in said receptacle, and a posting-board sliding in said ways.

9. The combination, with a receptacle, of cards slidably mounted for vertical movement in said receptacle, grooved rails carried by said receptacle, and a posting-board sliding in the grooves of said rails.

10. The combination, with a receptacle, of cards slidably mounted for vertical movement in said receptacle, grooved rails carried by said receptacle, means for locking said rails into place, and a posting-board having an opening therethrough sliding in the grooves of said rails.

11. The combination, with a receptacle having a series of dovetailed grooves formed in the sides thereof, of cards slidably mounted for vertical movement in said grooves, means for closing the ends of said grooves, and a posting-board movable longitudinally of the receptacle.

In testimony whereof I affix my signature in presence of two witnesses.

ARTHUR L. ALLIN.

Witnesses:
   JOSIAH H. PECK,
   FRANK G. CAMPBELL.